(12) United States Patent
Maier et al.

(10) Patent No.: US 12,153,597 B1
(45) Date of Patent: Nov. 26, 2024

(54) MULTIPLE SUBSCRIBER DATA EXTRACTION FOR A CHANGE DATA CAPTURE (CDC)

(71) Applicant: SAP SE, Walldorf (DE)

(72) Inventors: Florian Maier, Heidelberg (DE); Daniel Bos, Beijing (CN); Peter Schoenau, Untergruppenbach (DE); Tobias Karpstein, Eschelbronn (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/221,978

(22) Filed: Jul. 14, 2023

(51) Int. Cl.
  *G06F 16/25* (2019.01)
  *G06F 16/23* (2019.01)

(52) U.S. Cl.
  CPC ........ *G06F 16/254* (2019.01); *G06F 16/2379* (2019.01)

(58) Field of Classification Search
  CPC ............................ G06F 16/254; G06F 16/2379
  USPC .......................................................... 707/602
  See application file for complete search history.

(56) References Cited

U.S. PATENT DOCUMENTS

| | | | | |
|---|---|---|---|---|
| 11,055,262 B1* | 7/2021 | Cseri | ................... | G06F 16/2322 |
| 2009/0217274 A1* | 8/2009 | Corbin | .................... | G06F 9/466 |
| | | | | 718/101 |
| 2012/0143825 A1* | 6/2012 | Boehm | ................. | G06F 16/113 |
| | | | | 707/648 |
| 2014/0304229 A1* | 10/2014 | Zhu | ......................... | G06F 16/00 |
| | | | | 707/634 |
| 2019/0171650 A1* | 6/2019 | Botev | ................ | G06F 16/2358 |
| 2020/0320095 A1* | 10/2020 | Haase | ................ | G06F 16/2379 |
| 2021/0182267 A1* | 6/2021 | Andreakis | ............ | G06F 16/219 |
| 2022/0103618 A1* | 3/2022 | Pinheiro | ................. | H04L 67/60 |
| 2023/0120592 A1* | 4/2023 | Deshwal | .......... | G06F 16/24568 |
| | | | | 707/760 |

* cited by examiner

*Primary Examiner* — Hicham Skhoun
(74) *Attorney, Agent, or Firm* — Sterne, Kessler, Goldstein & Fox P.L.L.C.

(57) ABSTRACT

Disclosed herein are system, method, and computer program product embodiments for accessing a semantic change data capture (CDC). An embodiment operates by receiving a request for changes made to a source system from a consumer at a target system. The embodiment determines a high watermark stored in a consumer registration table based on the consumer. The embodiment further determines a set of open transactions on an enhanced data table. The embodiment then determines a set of changes made to the source system based on the high watermark and the set of open transactions. The embodiment transmits the set of changes to the consumer at the target system. The embodiment then receives a confirmation from the consumer at the target system that the set of changes were committed to the target system. The embodiment then updates the high watermark in the consumer registration table based on the confirmation.

20 Claims, 4 Drawing Sheets

FIG. 1

Enhanced Data Table 202

| Key I | Key II | Non-Key I | Non-Key II | Repl_Operation | Repl_Timestamp |
|---|---|---|---|---|---|
| XYZ | 123 | Crazy | Soccer <> sport | INS | 20221021095307001 |
| ABC | 658 | Don't know | Say something | UPD | 20221021095309015 |
| XYZ | 123 | <null> | <null> | DEL | 20221021105000001 |

Replication Operation 204
Replication Timestamp 206

FIG. 2A

Consumer Registration Table 210

| Data-Set | Customer-ID | High-Watermark |
|---|---|---|
| XYZ | 123 | 20221021095307001 |
| ABC | 658 | 20221021105000001 |

Customer ID 214
High Watermark 216
Data Set 212

MULTIPLE SUBSCRIBER DATA EXTRACTION FOR A CHANGE DATA CAPTURE (CDC)

BACKGROUND

A middleware layer (e.g., a replication server) can move and synchronize transactional data across an enterprise for data warehousing and/or analytical scenarios. For example, a middleware layer can move and synchronize transactional data from a source system (e.g., a source database management system (DBMS)) into several target systems (e.g., target DBMSs), all with their specific use-case scenarios and requirements.

In some cases, the middleware layer can multiplex the transactional data from the source system into several target systems without reading the data from the source system multiple times. This can often significantly reduce network traffic. Typically, an Extract-Transform-Load (ETL) tooling can be used to extract the changes from the source system, do any necessary transformations (e.g., target specific type mapping), and eventually load the data by considering the change operation into the target system. A change-data-capture (CDC) mechanism is a type of ETL tooling. A CDC mechanism can identify and capture changes made to data in a source system and then deliver those changes in real-time to a downstream process or target system. However, a CDC mechanism often suffers from various technological problems. First, a CDC mechanism may not perform a consistent extraction of data. This may lead to missing specific changes, and therefore not delivering all changes to the downstream process or target system. Second, a CDC mechanism may not allow multiple subscribers to extract the data. For example, the CDC mechanism may not provide a way to store which subscriber processed the data up to which state.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for implementing a semantic change-data-capture (CDC).

A CDC mechanism can identify and capture changes made to data in a source system (e.g., a database management system (DBMS)) and then deliver those changes in real-time to a downstream process or target system. A CDC mechanism can reduce the cost of transferring data over a network by sending only incremental changes A CDC mechanism can also help customers make faster and more accurate decisions based on the most recent, up-to-date data. For example, a CDC mechanism may propagate transactions directly to analytics applications A CDC mechanism can also minimize disruption to production workloads on the source system.

In some aspects, a CDC can be implemented in various ways to track and deliver changed data. For example, a CDC may be a trigger-based CDC. A trigger-based CDC can involve creating triggers in tables of the source system that are participating in replication. The triggers may be fired when a specific event occurs in a record (e.g., an insert trigger that is fired when a new record is inserted, an update trigger that is fired when a record is updated, and a delete trigger that is fired when a record is deleted).

A CDC may also be a transaction log CDC. A transaction log CDC can involve the source system using native transaction logs to store all database events so that the database can be recovered in the event of a failure.

In addition to identifying and capturing changes made to data in a source system and then delivering those changes in real-time to a downstream process or target system, a CDC mechanism can provide a way to multiplex the transactional data from the source system into several target systems without reading the data from the source system multiple times. This can often significantly reduce network traffic. Despite these benefits, a CDC mechanism may suffer from various technological problems.

First, a CDC mechanism may not perform a consistent extraction of data to consumers (also referred to as subscribers) at target systems. For example, a CDC mechanism may cause inconsistent results due to parallel processes (or threads) overtaking each other. This may lead to missing specific changes, and therefore not delivering all changes to the downstream process or target system.

Second, a CDC mechanism may not allow multiple subscribers to extract the changes to the data. For example, the CDC mechanism may not provide a way to store which subscriber processed the data up to which state.

To solve these technological problems, aspects herein utilize a semantic CDC mechanism. To facilitate a consistent extraction of data to consumers and allow multiple subscribers to extract the data, replication tooling in a middleware layer can enhance the changed data received from the source system with additional metadata and store the changed data with the additional metadata in a persistent storage in the middleware layer using an enhanced data table and consumer registration table.

Additionally, to facilitate performing a consistent extraction of data to consumers, the replication tooling in the middleware layer can ensure that the time used to indicate when the changed data records are written to the enhanced data table in the persistent storage in the middleware layer is produced by the persistent storage's own internal clock. The replication tooling in the middleware layer can also utilize a high water mark in the consumer registration table together with determining any open transactions on the enhanced data table to ensure a consistent extraction of data.

Additionally, aspects herein provide a means to track when transactions (e.g., sets of related changes to data) are started and when they are committed. Aspects herein further make this information available.

Figure 1:
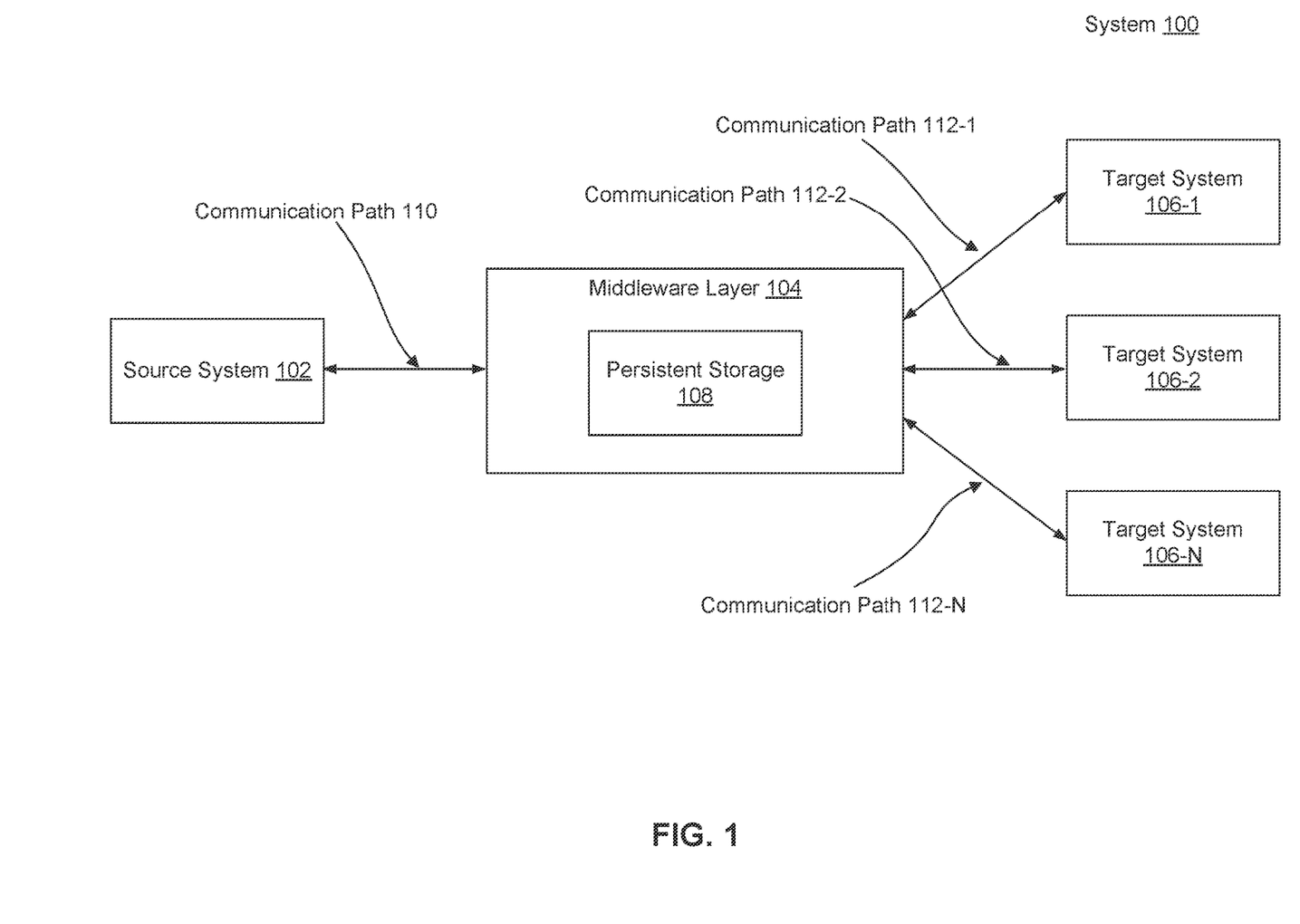
FIG. 1 is a block diagram of a system that implements a semantic change-data-capture (CDC), according to some aspects.

FIG. 1 is a block diagram of semantic CDC system 100 that performs a consistent extraction of data to consumers (or subscribers) at target systems and allows multiple subscribers to extract the changed data, according to some aspects. Semantic CDC system 100 may include source system 102, middleware layer 104, and one or more target systems 106.

Source system 102 may be a server, cloud computing system, computer cluster, virtual machine, container, or other device as would be appreciated by a person of ordinary skill in the art. Source system 102 may store various types of data of interest to consumers (e.g., at target systems 106). Source system 102 may identify and extract changes to the data using an ETL tooling (e.g., a CDC mechanism).

Middleware layer 104 may be a server, cloud computing system, computer cluster, virtual machine, container, or other device as would be appreciated by a person of ordinary skill in the art. Middleware layer 104 may execute a replication server or replication tooling that ingests changed data from source system 102.

A target system 106 may be a server, cloud computing system, computer cluster, virtual machine, container, or other device as would be appreciated by a person of ordinary skill in the art. A target system 106 may subscribe to changed data at source system 102. A consumer (or subscriber) at a target system 106 may also subscribe to changed data at source system 102.

Additionally, source system 102, middleware layer 104, and the one or more target systems 106 can be separate systems or the functionality can be combined in one or two systems. For example, middleware layer 104 may be located on source system 102 or a target system 106.

Source system 102 may use an ETL tooling (e.g., a CDC mechanism) to identify and extract changes made to source system 102. Source system 102 may use a trigger-based CDC to identify and extract changes made to source system 102. Source system 102 may also use a transaction log CDC to identify and extract changes made to source system 102. As would be appreciated by a person of ordinary skill in the art, source system 102 may use other types of CDC to identify and extract changes made to source system 102.

Source system 102 may replicate the changes made to source system 102 into middleware layer 104 that is used to perform additional steps. These additional steps can include, but are not limited to, direct consumption by analytical use-cases, data enrichment, data cleansing, data extraction into other systems, and data extraction into specialized persistency layers (e.g., message systems or object stores).

Source system 102 may replicate the changes made to source system 102 into middleware layer 104 over communication path 110. Communication path 110 may be wired and/or wireless (or a combination thereof), and which may include any combination of LANs, WANs, the Internet, etc.

In some cases, source system 102 may replicate the changes made to source system 102 into middleware layer 104 for later data extraction into one or more target systems 106. For example, by operating as a staging layer, middleware layer 104 can multiplex the transactional data from source system 102 into one or more target systems 106 without reading the data from source system 102 multiple times.

Middleware layer 104 may transmit the changes made to source system 102 to one or more consumers at target systems 106. Middleware layer 104 may transmit the changes made to source system 102 to one or more consumers at target systems 106 over communication paths 112. A communication path 112 may be wired and/or wireless (or a combination thereof), and which may include any combination of LANs, WANs, the Internet, etc.

Middleware layer 104 may store the changes made to source system 102 in persistent storage 108. Persistent storage 108 can be any data storage device or system that retains data after power to that device or system is shut off.

Middleware layer 104 may receive the changes made to sources system 102 via various mechanisms. For example, middleware layer 104 may receive one or more changes made to data in source system 102 via an ingestion Application Programming Interface (API) A received change may include the changed record in source system 102 and a type of change of the changed record (e.g., an insert transaction, an update transaction, or a delete transaction).

To facilitate a consistent extraction of data to consumers and allow multiple subscribers to extract the changed data of source system 102, middleware layer 104 can enhance the changed data received from source system 102 with additional metadata. Middleware layer 104 can then store the changed data with the additional metadata in persistent storage 108 using an enhanced data table and a consumer registration table. For example, during ingestion, middleware layer 104 can store each change together with a type of the change (also referred to as a replication operation) and a replication timestamp representing the time the associated change was replicated.

Middleware layer 104 can read a type of the change (e.g., a replication operation) from source system 102. The replication operation can specify the operation which happened in source system 102. For example, the replication operation can specify that an insert operation occurred in source system 102. The replication operation can also specify that an update operation occurred in source system 102. The replication operation can also specify that a delete operation occurred in source system 102.

A replication timestamp for a change can represent the time the associated change was replicated. As discussed further below, to avoid inconsistent results (e.g., a failure to deliver all changes to a downstream process or target system 106) due to parallel processes (or threads) overtaking each other, the replication timestamp can be calculated based on the internal clock of persistent storage 108. For example, the replication timestamp can be set to the time of the internal clock of persistent storage 108 when the associated change is committed to persistent storage 108.

Figure 2A:
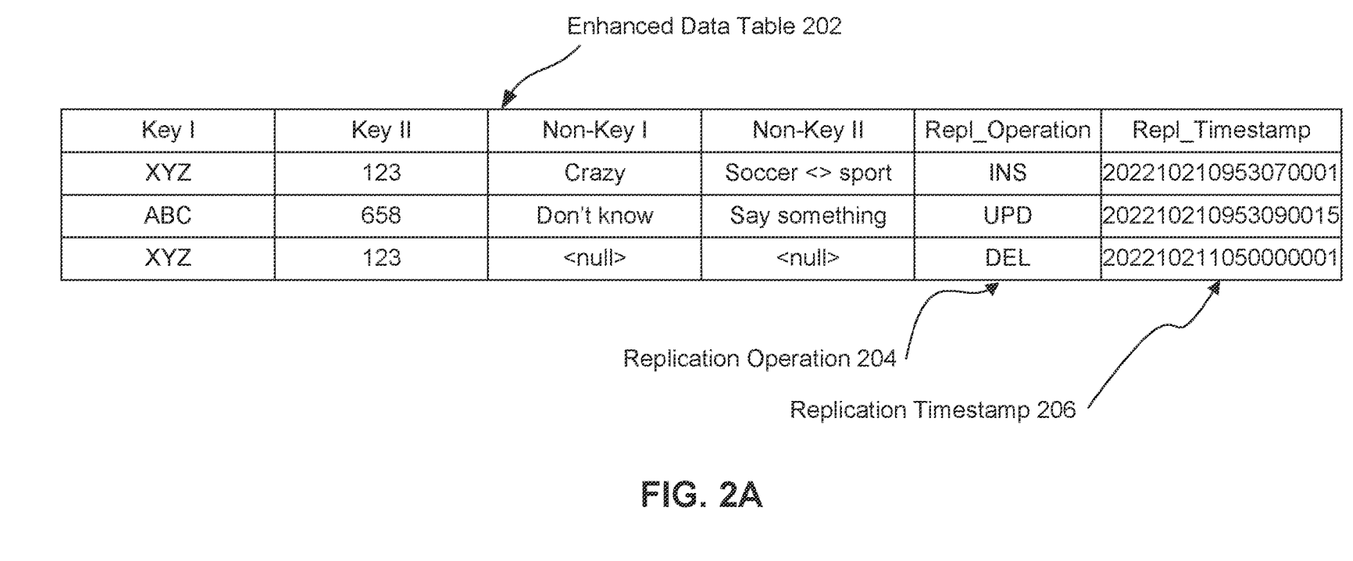
FIG. 2A is an example of an enhanced data table for implementing a semantic CDC, according to some aspects.

FIG. 2A is an example of an enhanced data table 202 for implementing a semantic CDC, according to some aspects. FIG. 2A is discussed herein with reference to FIGS. 1 and 2B.

Enhanced data table 202 may be stored in persistent storage 108. Middleware layer 104 can use enhanced data table 202 together with a consumer registration table (e.g., consumer registration table 210 in FIG. 2B) to ensure a consistent extraction of data to consumers and allow multiple subscribers to extract the changed data of source system 102.

Enhanced data table 202 may include one or more rows each representing a change made to source system 102. Enhanced data table 202 may include details about the change made to source system 102 across one or more columns. For example, enhanced data table 202 may include the before and after image of the change in the one or more columns.

To facilitate a consistent extraction of data to consumers and allow multiple subscribers to extract the changed data of source system 102, each change made to source system 102 that is stored in enhanced data table 202 (e.g., each row) may be augmented with two additional details (e.g., implemented as two additional columns): replication operation 204 and replication timestamp 206. During the ingestion of a change made to source system 102, middleware layer 104 can store a replication operation for the change (e.g., read by middleware layer 104 from source system 102) in replication operation 204. Similarly, during the ingestion of the change made to source system 102, middleware layer 104 can determine the time the change was committed to enhanced data table 202 in persistent storage 108 (e.g., based on the internal clock of persistent storage 108) and set replication timestamp 206 to the determined time.

Figure 2B:
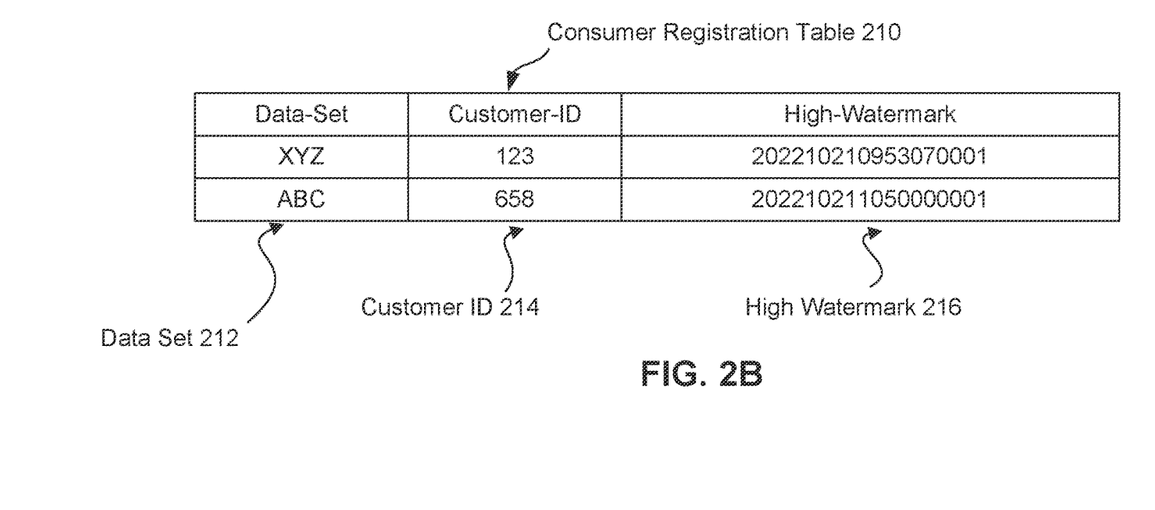
FIG. 2B is an example a consumer registration table for implementing a semantic CDC, according to some aspects.

FIG. 2B is an example of a consumer registration table 210 for implementing a semantic CDC, according to some aspects. FIG. 2B is discussed here with reference to FIGS. 1 and 2A.

Consumer registration table 210 may be stored in persistent storage 108. Middleware layer 104 can use enhanced data table 202 together with consumer table 210 to ensure a consistent extraction of data to consumers (e.g., at target systems 106) and allow multiple subscribers to extract the changed data of source system 102. Middleware layer 104 can also use enhanced data table 202 together with consumer table 210 to ensure that a consumer does not receive changed data that it already processed.

Consumer registration table 210 may include one or more subscriptions (e.g., a particular set of data in source system 102 that a particular consumer is interested in receiving any changes made to the particular set of data). Consumer registration table 210 may store each subscription as a row. Consumer registration table 210 may store various data for each subscription, thereby allowing multiple subscribers to extract the changed data of source system 102. For example, consumer registration table 210 may store the various data for each subscription (e.g., row) across one or more columns.

For each subscription, consumer registration table 210 may include data set 212 that identifies a particular set of data in source system 102 for which changes made to the particular set of data are to be distributed to a consumer(s). Consumer registration table 210 may also include a consumer ID 214 that uniquely identifies a consumer who is interested in receiving the changes made to the particular set of data identified by data set column 212. Consumer registration table 210 may also include a high watermark 216. High watermark 216 may be a timestamp specifying the last time that changes made to the particular set of data were successfully replicated (e.g., committed to a consumer at a target system 106). Middleware layer 104 may set the timestamp specifying the last time that changes made to the particular set of data were successfully replicated to the time of the internal clock of persistent storage 108 when the replication was successful performed.

To facilitate extraction, middleware layer 104 may receive a request for changed data at source system 102 from a consumer at a target system 106. Middleware layer 104 may receive the request for changed data at source system 102 at an egress API. Middleware layer 104 may look up the high watermark 216 associated with the consumer for the particular set of data of interest. Middleware layer 104 may look up the relevant high watermark 216 in consumer registration table 210 according to the consumer ID of the consumer who submitted the request for the changed data at source system 102.

Once middleware layer 104 determines the relevant high watermark 216, middleware layer 104 may extract all changes (e.g., for the particular set of data) in enhanced data table 202 that have a corresponding replication timestamp 206 that occurs at or after the relevant high watermark 216 (e.g., equal to or more recent in time to the relevant high watermark 216). Middleware layer 104 may then replicate these changes to the consumer at the target system 106. Middleware layer 104's use of high watermark 216 can ensure that just new and unprocessed changes are replicated to the consumer at the target system 106. Middleware layer 104 may receive a confirmation that the changes were successfully replicated (e.g., from the consumer at the target system 106). After the changes were successfully replicated, middleware layer 104 may update the relevant high watermark 216 to the timestamp of the most recent change that was successfully replicated.

Middleware layer 104 may also replicate all these changes to the consumer at the target system 106 in batches. For a portion of the changes, middleware layer 104 may replicate that portion of changes as a package to the consumer at the target system 106. Middleware layer 104 may receive a confirmation that each package was successfully replicated (e.g., from the consumer at the target system 106) After each package is successfully replicated, middleware layer 104 may update the relevant high watermark 216 to the timestamp of the package (e.g., the timestamp of the most recent change in the package) that was successfully replicated. For each access cycle (e.g., each processing of a new package of changes), middleware layer 104 may update the relevant high watermark 216 to the timestamp of the package that was successfully replicated.

To ensure that the enhanced data table 202 does not become too large in size, middleware layer 104 may identify the overall lowest high watermark 216 in consumer registration table 210. Middleware layer 104 may then identify all changes in enhanced data table 202 that have a replication operation of "delete" and a corresponding replication timestamp 206 that occurs before the lowest high watermark 216 (e.g., earlier in time then the overall lowest high watermark 216). Middleware layer 104 may then delete these identified changes from enhanced data table 202.

In some aspects, it is often important that a consistent extraction of data is performed to consumers at target systems 106. For example, it is often important all changes are delivered to the downstream process or target system 106. In other words, it is important that middleware layer 104 ensure that a downstream process or target system 106 does not miss specific changes. However, this may occur in some cases.

In some aspects, inconsistent results (e.g., missing specific changes) may occur where parallel processes (or threads) write the received changes made to source system 102 to enhanced data table 202 in persistent storage 108. This can be caused by how the replication timestamp 208 is calculated.

By way of example and not limitation, consider the case of two parallel writing PODS (e.g., POD 1 and POD 2). A POD may be a deployable unit of computing comprising a group of one or more containers. POD 1 may write change records to enhanced data table 202 at time $t_i$ with its internal clock (UTC+2). For example, POD 1 may write change records to enhanced data table 202 at time 12:02 UTC. POD 2 may write change records to enhanced data table 202 at time $t_j$ with its internal clock (UTC+1). For example, POD 2 may write change records to enhanced data table 202 at time 12:01 UTC. A consumer at a target system 106 may read change records from enhanced data table 202 at time $t_j$, where $t_i < t_j < t_k$. The consumer may then update its associated high watermark 216 in consumer registration table 210 to time UTC+2 (e.g., 12:02 UTC) in response to successfully replicating the changes. Thus, change records written by POD 2 have a smaller timestamp compared to change records already marked as processed. As a result, these change records are never picked up (e.g., replicated to the consumer at the target system 106).

As discussed above, to solve this technological problem, middleware layer 104 can ensure that the replication timestamp 206 for a change is set according to the internal clock of persistent storage 108. In other words, middleware layer 104 can ensure that the replication timestamp 206 is produced by persistent storage 108 itself. This can prevent misalignment within the PODS (or processes or threads) have no influence on consumers at target systems 106.

Beyond the above, in some aspects, inconsistent results (e.g., missing specific changes) may still happen because it is often unclear which change records can be safely read from enhanced data table 202 as no additional records will be committed with a lower timestamp in the future. For example, this may occur where there are open transactions on enhanced data table 202.

To solve the above technological problem, middleware layer 104 can look up the open transactions on enhanced data table 202. Middleware layer 104 can look up the open transactions on enhanced data table 202 in various ways as would be appreciated by a person of ordinary skill in the art. For example, middleware layer 104 can look up the open transactions on enhanced data table 202 by issuing a database query (e.g., a Structured Query Language (SQL) query) against various database views that provide information about transactions created by users or the database. Middleware layer 104 can issue the database query against the various database views in view of enhanced data table 202. For example, middleware layer 104 can issue the database query that joins the various database views with enhanced data table 202 subject to certain conditions. Middleware layer 104 can also look up the open transactions on enhanced data table 202 by issuing a database query based on enhanced data table 202 and in view of various metadata tracked by middleware layer 104.

In some aspects, to ensure a consistent extraction of data is performed to consumers at target systems 106, middleware layer 104 can utilize high watermark 216 as described above with the results of looking up the open transactions on enhanced data table 202. This can ensure that inconsistent results (e.g., missing specific changes) do not occur either where parallel processes (or threads) write the received changes made to source system 102 to enhanced data table 202 or where there open transaction on enhanced data table 202.

In some aspects, when middleware layer 104 receives a request for changed data from consumer at a target system 106, middleware layer 104 may look up the relevant high watermark 216 in consumer registration table 210 according to the consumer ID of the consumer who submitted the request for the changed data at source system 102. Once middleware layer 104 determines the relevant high watermark 216, middleware layer 104 can look up the open transactions on enhanced data table 202. If there are no open transactions, this indicates there is no process (or thread) currently writing to enhanced data table 202, and thus future processes (or threads) will get a higher replication timestamp 206 than the currently existing change records in enhanced data table 202. If there are open transactions, middleware layer 104 can take the start time of the oldest transaction (e.g., earliest start time) of the open transactions and use the start time as an upper bound filter criteria when determining which changes to extract from enhanced data table 202 for the consumer who submitted the request for the changed data at source system 102. For example, middleware layer 104 can ensure that it does not extract changes from enhanced data table 202 past the start time of the oldest transaction of the open transactions.

In some aspects, to avoid middleware layer 104 having to implement the above logic that utilizes high watermark 216 with the results of looking up the open transactions on enhanced data table 202 by every process, middleware layer 104 can implement a stable API. For example, middleware layer 104 can implement the stable API as a SQL view. Middleware layer 104 may provide a delta view that implements the above logic that utilizes high watermark 216 with the results of looking up the open transactions on enhanced data table 202. Middleware layer 104's delta view may include the logic of identifying the lower and upper bounds of the filter criteria for extracting the latest changes to source system 102 (e.g., since a previous request) for a particular subscription in consumer registration table 210.

The input to the delta view may be the consumer ID of the consumer (e.g., consumer process) requesting the latest changes to source system 102 (e.g., since a previous request). Middleware layer 104's delta view may determine a lower bound (e.g., the high watermark 216 in consumer registration table 210 that is associated with the consumer ID of the requesting consumer) and an upper bound (e.g., the timestamp of the oldest open transaction on enhanced data table 202 or, if there are no open transactions, infinity). Middleware layer 104 may extract all changes from the resulting delta view and replicate these changes to the consumer at the target system 106.

In some aspects, middleware layer 104 may replicate all changes from the resulting delta view to the consumer at the target system 106 in batches. For a portion of the changes, middleware layer 104 may replicate that portion of changes as a package to the consumer at the target system 106. After each package is successfully replicated, middleware layer 104 may update the relevant high watermark 216 to the timestamp of the package after being successfully replicated. For each access cycle (e.g., each processing of a new package of changes), middleware layer 104 may update the relevant high watermark 216 to the timestamp of the package after being successfully replicated. For each access cycle, middleware layer 104's delta view may also recalculate the lower and upper bounds for the next package extraction to the consumer at the target system 106. This can avoid producing duplicates changes to the consumer at the target system 106.

Additionally, middleware layer 104 may also provide a full view for querying the enhanced data table 202 like any other table (e.g., a federation use-case or scenario without the need for delta (e.g., without getting the latest changes to source system 102 since a previous request).

Figure 3:
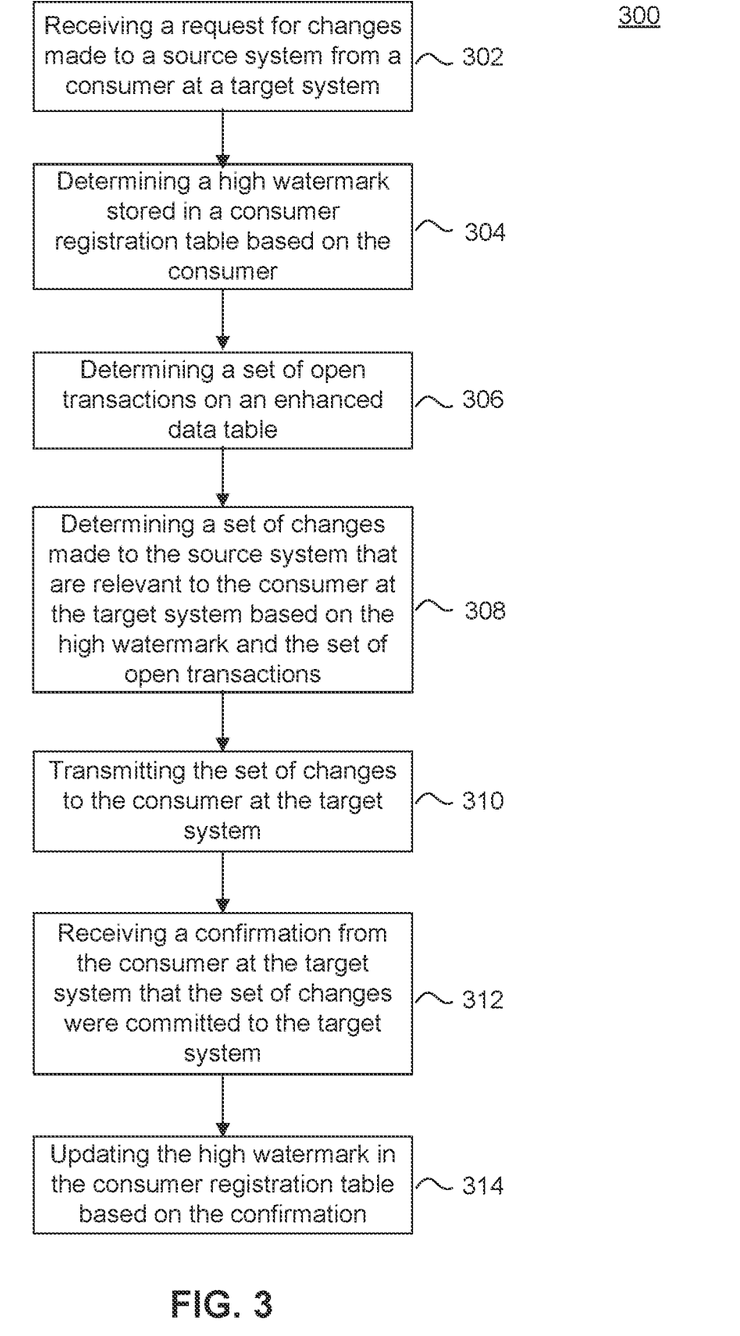
FIG. 3 is a flowchart illustrating a process for accessing a semantic change data capture (CDC), according to some embodiments.

FIG. 3 is a flowchart for a method 300 for accessing a semantic CDC, according to some aspects. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

Method 300 shall be described with reference to FIGS. 1, 2A, and 2B. However, method 300 is not limited to that example aspect.

In 302, middleware layer 104 receives a request for changes made to source system 102 from a consumer at a target system 106. The changes to the sources system 102 may be stored in enhanced data table 202.

Enhanced data table 202 may include one or more rows each representing a change made to source system 102. Enhanced data table 202 may include details about the change made to source system 102 across one or more columns. For example, enhanced data table 202 may include the before and after image of the change in the one or more columns.

Each change made to source system 102 that is stored in enhanced data table 202 (e.g., each row) may be augmented with two additional details (e.g., implemented as two additional columns): replication operation 204 and replication timestamp 206. During the ingestion of a change made to source system 102, middleware layer 104 can store a replication operation for the change (e.g., read by middleware layer 104 from source system 102) in replication operation 204. Similarly, during the ingestion of the change made to source system 102, middleware layer 104 can determine the time the change was committed to enhanced data table 202 in persistent storage 108 (e.g., based on the internal clock of persistent storage 108) and set replication timestamp 206 to the determined time.

In 304, middleware layer 104 determines a high watermark 216 stored in consumer registration table 210 based on the consumer and in response to receiving the request in 302. Middleware layer 104 may determine the high watermark 216 stored in consumer registration table 210 based on a consumer ID associated with the consumer.

In 306, middleware layer 104 determines a set of open transactions on the enhanced data table 202 in response to receiving the request in 302. For example, middleware layer 104 may determine the earliest start time of the open transactions on the enhanced data table 202. Middleware layer 104 can look up the open transactions on enhanced data table 202 using various mechanisms as would be appreciated by a person of ordinary skill in the art. For example, middleware layer 104 can look up the open transactions on enhanced data table 202 by executing a database query (e.g., a SQL query) on a database view that provides information about transactions created by users or the database Middleware layer 104 may look up the open transactions on enhanced data table 202 by executing a database query (e.g., a SQL query) against a database view (e.g., a database view that provides information about transactions) associated with enhanced data table 202. Middleware layer 104 can issue the database query against various database views in view of enhanced data table 202. Middleware layer 104 can issue the database query that joins the various database views with enhanced data table 202 subject to certain conditions. Middleware layer 104 can also look up the open transactions on enhanced data table 202 by executing a database query based on enhanced data table 202 and in view of various metadata tracked by middleware layer 104.

In 308, middleware layer 104 determines a set of changes made to source system 102 that are relevant to the consumer at the target system 106 (e.g., the latest changes made to source system 102 since the last request by the consumer at the target system 106) based on the high watermark 216 and the set of open transactions. Middleware layer 104 may select the set of changes having a replication timestamp 206 between the high watermark 216 and a timestamp of the oldest transaction in the set of open transactions. In some cases, middleware layer 104 may determine there are no open transactions (e.g., the set of open transaction is a null set). Middleware layer 104 may therefore select the set of changes having a replication timestamp 206 between the high watermark and infinity.

Middleware layer 104 may determine the set of changes made to source system 102 that are relevant to the consumer at the target system 106 based on a database view that utilizes the high watermark 216 and the set of open transactions. Middleware layer 104 may also determine the set of changes made to source system 102 that are relevant to the consumer at the target system based on a consumer identifier (ID) associated with the consumer.

In 310, middleware layer 104 transmits the set of changes to the consumer at the target system 106. Middleware layer 104 may replicate the set of changes to the consumer at the target system 106 in batches. For a portion of the changes, middleware layer 104 may replicate that portion of changes as a package to the consumer at the target system 106.

In 312, middleware layer 104 receives a confirmation from the consumer at the target system that the set of changes were committed to the target system 106.

In 314, middleware layer 104 updates the high watermark 216 in the consumer registration table 210 based on the confirmation. For example, middleware layer 104 may update the high watermark 216 to the timestamp of the most recent change that was successfully replicated. In some cases where middleware layer 104 replicates the set of changes to the consumer at the target system 106 in batches (e.g., packages), middleware layer 104 may update the high watermark 216 to the timestamp of the most recent package (e.g., the timestamp of the most recent change in the package) that was successfully replicated.

Figure 4:
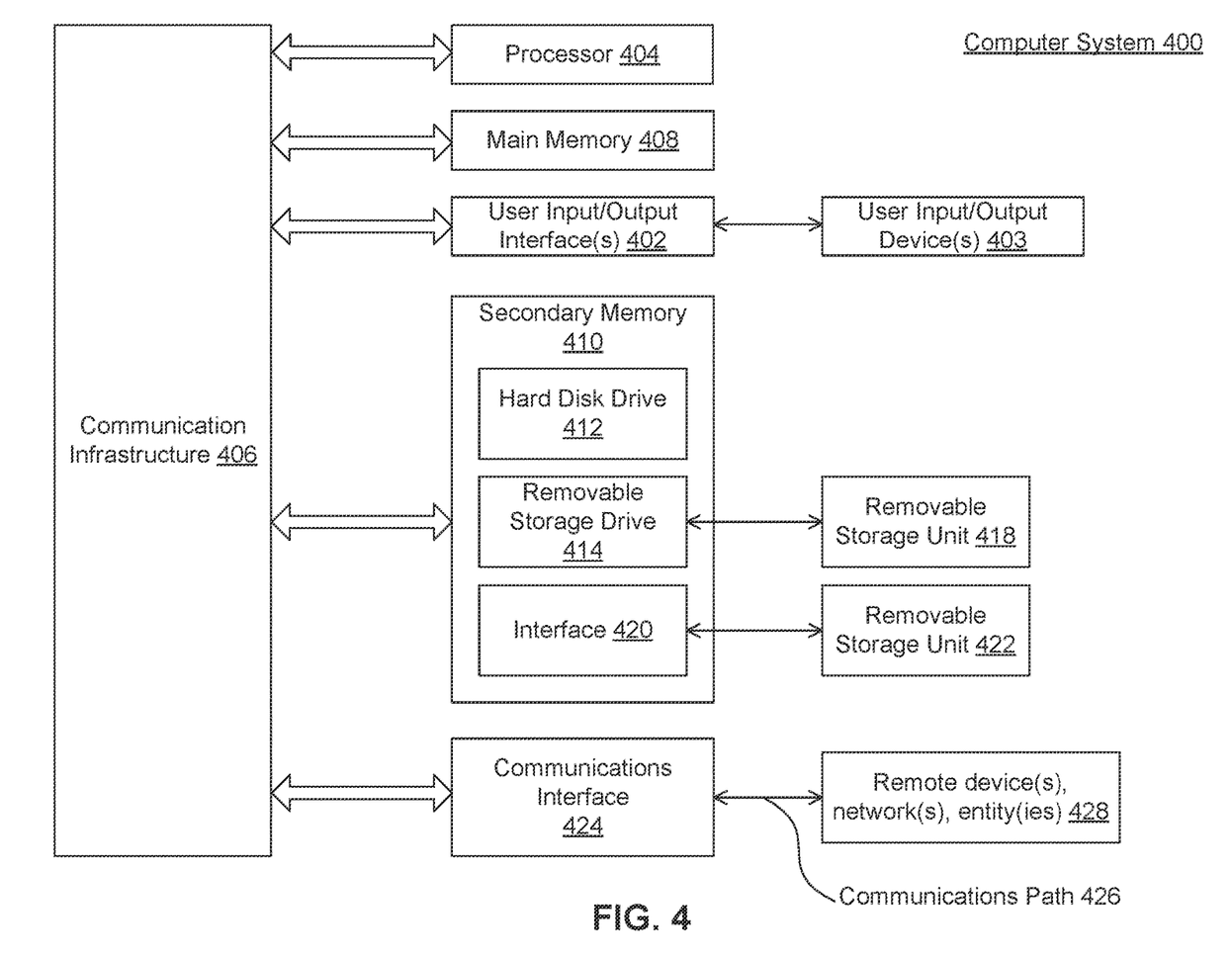
FIG. 4 is an example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include user input/output device(s) 403, such as monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for accessing a semantic change data capture (CDC), comprising:
    receiving, by at least one computer processor at a middleware system, a request for changes made to a source system from a consumer at a target system, wherein changes to the source system are stored in an enhanced data table in the middleware system, and the middleware system is communicatively coupled to the source system and the target system;
    in response to receiving the request, determining a high watermark stored in a consumer registration table based on the consumer, wherein the high watermark is a timestamp calculated according to a clock of the middleware system and is specific to the consumer;
    in response to receiving the request, determining a set of open transactions on the enhanced data table, wherein the set of open transactions represent uncommitted changes to the enhanced data table;
    determining a set of changes made to the source system that are relevant to the consumer at the target system based on the high watermark and the set of open transactions;
    transmitting the set of changes to the consumer at the target system;
    receiving a confirmation from the consumer at the target system that the set of changes were committed to the target system; and
    updating the high watermark in the consumer registration table based on the confirmation.

2. The computer-implemented method of claim 1, wherein the changes in the enhanced data table comprise a replication operation indicating a type of change made in the source system, and a replication timestamp produced by the clock of the middleware system and that indicates when the change was committed to a persistent storage.

3. The computer-implemented method of claim 1, wherein the determining the set of open transactions comprises:
    executing a Structured Query Language (SQL) query on a database view associated with the enhanced data table.

4. The computer-implemented method of claim 1, wherein the determining the set of changes comprises:
    selecting the set of changes having a replication timestamp between the high watermark and a timestamp of the oldest transaction in the set of open transactions.

5. The computer-implemented method of claim 1, wherein the determining the set of changes comprises:
    determining the set of open transaction is a null set; and
    selecting the set of changes having a replication timestamp between the high watermark and infinity.

6. The computer-implemented method of claim 1, wherein the determining the set of changes comprises:
    determining the set of changes made to the source system that are relevant to the consumer at the target system based on a database view that utilizes the high watermark and the set of open transactions.

7. The computer-implemented method of claim 1, wherein the determining the set of changes comprises:
    determining the set of changes made to the source system that are relevant to the consumer at the target system based on a consumer identifier (ID) associated with the consumer.

8. A system accessing a semantic change data capture (CDC), comprising:
    one or more memories;
    at least one processor each coupled to at least one of the memories and configured to perform operations comprising:
        receiving, at the system, a request for changes made to a source system from a consumer at a target system, wherein changes to the source system are stored in an enhanced data table in the system, and the system is communicatively coupled to the source system and the target system;
        in response to receiving the request, determining a high watermark stored in a consumer registration table based on the consumer, wherein the high watermark is a timestamp calculated according to a clock of the system and is specific to the consumer;
        in response to receiving the request, determining a set of open transactions on the enhanced data table, wherein the set of open transactions represent uncommitted changes to the enhanced data table;
        determining a set of changes made to the source system that are relevant to the consumer at the target system based on the high watermark and the set of open transactions;
        transmitting the set of changes to the consumer at the target system;
        receiving a confirmation from the consumer at the target system that the set of changes were committed to the target system; and
        updating the high watermark in the consumer registration table based on the confirmation.

9. The system of claim 8, wherein the changes in the enhanced data table comprise a replication operation indicating a type of change made in the source system, and a replication timestamp produced by the clock of the system and that indicates when the change was committed to a persistent storage.

10. The system of claim 8, wherein the determining the set of open transactions comprises:
    executing a Structured Query Language (SQL) query on a database view associated with the enhanced data table.

11. The system of claim 8, wherein the determining the set of changes comprises:
    selecting the set of changes having a replication timestamp between the high watermark and a timestamp of the oldest transaction in the set of open transactions.

12. The system of claim 8, wherein the determining the set of changes comprises:
    determining the set of open transaction is a null set; and
    selecting the set of changes having a replication timestamp between the high watermark and infinity.

13. The system of claim 8, wherein the determining the set of changes comprises:
    determining the set of changes made to the source system that are relevant to the consumer at the target system based on a database view that utilizes the high watermark and the set of open transactions.

14. The system of claim 8, wherein the determining the set of changes comprises:

determining the set of changes made to the source system that are relevant to the consumer at the target system based on a consumer identifier (ID) associated with the consumer.

15. A non-transitory computer-readable medium having instructions stored thereon that, when executed by at least one computing device, cause the at least one computing device to perform operations comprising:

receiving, by the at least one computer device, a request for changes made to a source system from a consumer at a target system, wherein changes to the source system are stored in an enhanced data table;

in response to receiving the request, determining a high watermark stored in a consumer registration table based on the consumer, wherein the high watermark is a timestamp calculated according to a clock of the at least one computer device and is specific to the consumer;

in response to receiving the request, determining a set of open transactions on the enhanced data table, wherein the set of open transactions represent uncommitted changes to the enhanced data table;

determining a set of changes made to the source system that are relevant to the consumer at the target system based on the high watermark and the set of open transactions;

transmitting the set of changes to the consumer at the target system;

receiving a confirmation from the consumer at the target system that the set of changes were committed to the target system; and updating the high watermark in the consumer registration table based on the confirmation.

16. The non-transitory computer-readable medium of claim 15, wherein the changes in the enhanced data table comprise a replication operation indicating a type of change made in the source system, and a replication timestamp produced by the clock of the at least one computing device and that indicates when the change was committed to a persistent storage.

17. The non-transitory computer-readable medium of claim 15, wherein the determining the set of open transactions comprises:

executing a Structured Query Language (SQL) query on a database view associated with the enhanced data table.

18. The non-transitory computer-readable medium of claim 15, wherein the determining the set of changes comprises:

selecting the set of changes having a replication timestamp between the high watermark and a timestamp of the oldest transaction in the set of open transactions.

19. The non-transitory computer-readable medium of claim 15, wherein the determining the set of changes comprises:

determining the set of open transaction is a null set; and
selecting the set of changes having a replication timestamp between the high watermark and infinity.

20. The non-transitory computer-readable medium of claim 15, wherein the determining the set of changes comprises:

determining the set of changes made to the source system that are relevant to the consumer at the target system based on a database view that utilizes the high watermark and the set of open transactions.

\* \* \* \* \*